(12) United States Patent
Saenger

(10) Patent No.: US 9,841,511 B2
(45) Date of Patent: Dec. 12, 2017

(54) DOWNHOLE GAS-FILLED RADIATION DETECTOR WITH OPTICAL FIBER

(71) Applicant: Schlumberger Technology Corporation, Sugar Land, TX (US)

(72) Inventor: Richard G Saenger, Chatillon (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 183 days.

(21) Appl. No.: 14/646,726

(22) PCT Filed: Dec. 5, 2013

(86) PCT No.: PCT/US2013/073210
§ 371 (c)(1),
(2) Date: May 21, 2015

(87) PCT Pub. No.: WO2014/089256
PCT Pub. Date: Jun. 12, 2014

(65) Prior Publication Data
US 2015/0309191 A1    Oct. 29, 2015

(30) Foreign Application Priority Data

Dec. 6, 2012   (EP) .................................. 12306534

(51) Int. Cl.
*G01T 1/20*     (2006.01)
*G01T 1/18*     (2006.01)
(Continued)

(52) U.S. Cl.
CPC ............... *G01T 1/205* (2013.01); *G01T 1/18* (2013.01); *G01T 1/2002* (2013.01); *G01V 5/04* (2013.01)

(58) Field of Classification Search
CPC .. G01T 3/06; G01T 1/201; G01T 1/20; G01T 1/2002; G01T 1/18; G01V 5/04
(Continued)

(56) References Cited

U.S. PATENT DOCUMENTS 3,299,306 A * 1/1967 Kapany .................. H01J 43/08
                                                  136/246
3,669,095 A * 6/1972 Kobayashi ........... A61B 6/4057
                                                128/DIG. 14
(Continued)

FOREIGN PATENT DOCUMENTS

FR        2690785 A1    11/1993
WO        2011/101098    8/2011

OTHER PUBLICATIONS

D. Anderson, et al., "Some advances in the use of the light produced by electron avalanches in gaseous detectors," Nuclear Instruments and Methods in Physics Research, vol. 201, Issue 2-3, Oct. 1, 1982, pp. 527-529.
(Continued)

*Primary Examiner* — David Porta
*Assistant Examiner* — Blake Riddick
(74) *Attorney, Agent, or Firm* — Michael Dae

(57) ABSTRACT

Systems and devices are provided that relate to a gas-filled radiation detector with an internal optical fiber. The internal optical fiber may detect photons emitted during ionization avalanche events triggered by incident radiation. Such a radiation detector may include a housing, a fill gas within the housing, and an optical fiber within the housing. The fill gas may interact with radiation through an ionization avalanche that produces light. The optical fiber within the housing may capture the light and transmit the light out of the housing.

15 Claims, 7 Drawing Sheets

(51) Int. Cl.
  *G01V 5/04* (2006.01)
  *G01T 1/205* (2006.01)
(58) Field of Classification Search
  USPC ............................ 250/256, 368, 390.11, 254
  See application file for complete search history.

(56) References Cited

U.S. PATENT DOCUMENTS

| | | | | |
|---|---|---|---|---|
| 4,669,821 A * | 6/1987 | Blair | ................ | C03B 37/01807 385/127 |
| 4,769,609 A * | 9/1988 | Masuda | ............. | G01N 15/0266 324/455 |
| 5,032,729 A * | 7/1991 | Charpak | ................. | H01J 47/02 250/374 |
| 5,294,789 A * | 3/1994 | Kruger | .................... | H01J 47/06 250/214.1 |
| 5,298,755 A * | 3/1994 | Wuest | ................... | H05H 1/0031 250/374 |
| 5,311,010 A * | 5/1994 | Kruger | .................. | H01J 29/385 250/214 VT |
| 5,313,065 A * | 5/1994 | Reed | ........................ | G01T 1/201 250/367 |
| 5,453,609 A * | 9/1995 | Gomez | ................. | H01J 43/246 250/207 |
| 5,734,689 A * | 3/1998 | Copeland | .................. | G01T 3/00 250/390.01 |
| 6,087,666 A | 7/2000 | Huston et al. | | |
| 6,486,468 B1 | 11/2002 | Lacy | | |
| 7,244,572 B1 * | 7/2007 | Schwabacher | ....... | B01J 19/0046 435/287.1 |
| 8,272,249 B1 * | 9/2012 | Herring | .................. | G01N 30/74 73/23.37 |
| 2002/0001068 A1 * | 1/2002 | Iwanczyk | ............ | A61B 6/4057 353/121 |
| 2003/0028114 A1 * | 2/2003 | Casscells, III | ....... | A61B 5/0077 600/474 |
| 2003/0039458 A1 * | 2/2003 | Miller et al. | .......... | C03C 25/108 385/128 |
| 2003/0168595 A1 * | 9/2003 | Danilatos | .............. | H01J 37/301 250/310 |
| 2004/0071433 A1 * | 4/2004 | Sugihara | .................... | G01T 1/20 385/144 |
| 2005/0199793 A1 * | 9/2005 | Croydon | ................. | G01T 1/185 250/252.1 |
| 2007/0190454 A1 * | 8/2007 | Lee | ........................ | G03F 7/0045 430/270.1 |
| 2007/0203404 A1 * | 8/2007 | Zysk | .................... | A61B 5/0084 600/310 |
| 2009/0050812 A1 * | 2/2009 | Dunleavy | ................ | G01T 1/201 250/368 |
| 2009/0290160 A1 * | 11/2009 | Taverner | .................... | G01J 3/02 356/419 |
| 2010/0084562 A1 * | 4/2010 | Angell | ........................ | G01T 1/11 250/363.01 |
| 2011/0038587 A1 * | 2/2011 | Shaw | ..................... | C03B 37/023 385/127 |
| 2011/0095674 A1 * | 4/2011 | Herring | .................... | H01J 9/025 313/496 |
| 2011/0291010 A1 * | 12/2011 | Katane | ................... | H01J 37/244 250/310 |
| 2012/0217406 A1 * | 8/2012 | McGregor | .............. | G01T 3/008 250/361 R |
| 2012/0223242 A1 * | 9/2012 | Brown | ..................... | G01T 3/008 250/391 |
| 2013/0006118 A1 * | 1/2013 | Pan | ........................ | A61N 5/0616 600/476 |
| 2013/0015339 A1 * | 1/2013 | Saenger | .................... | G01V 5/06 250/256 |
| 2013/0068941 A1 * | 3/2013 | Nikitin | .................... | G01V 5/107 250/269.4 |
| 2014/0299759 A1 * | 10/2014 | Allsworth | ............. | H01J 49/168 250/281 |

OTHER PUBLICATIONS

D.H. Beddingfield, et al., "High-pressure xenon ion chambers for gamma-ray spectroscopy in nuclear safegurds," Nuclear Instruments and Methods in Physics Research A 505 (2003), pp. 474-477.
W. Zhu, et al., "Implementation of three functional devices using Erbium-doped Fibers: An Advanced Photonics Lab," SPIE Organization, ETOP, Ottawa, 2007.
R.A. Austin, et al, "A High-Pressure Gas-Scintillation-Proportional Counter for the Focus of a Hard-X-Ray Telescope," Proc. SPIE Conference vol. 3765, EUV, X-Ray, and Gamma-Ray Instrumentation for Astronomy X, 714, Oct. 22, 1999.
R. Chen, et al., "The nonmonotonic dose dependence of optically stimulated luminescence in Al2O3: C: Analytical and numerical simulation results," Journal of Applied Physics, 99, 033511 (2006).
International Search Report and written opinion issued in the related PCT application PCT/US2013/073210, dated Mar. 21, 2014 (12 pages).
International preliminary report on patentability issued in the related PCT application PCT/US2013/073210, dated Jun. 9, 2015 (7 pages).
Extended Search Report issued in the related EP Application 12306534.4, dated May 14, 2013 (8 pages).

* cited by examiner

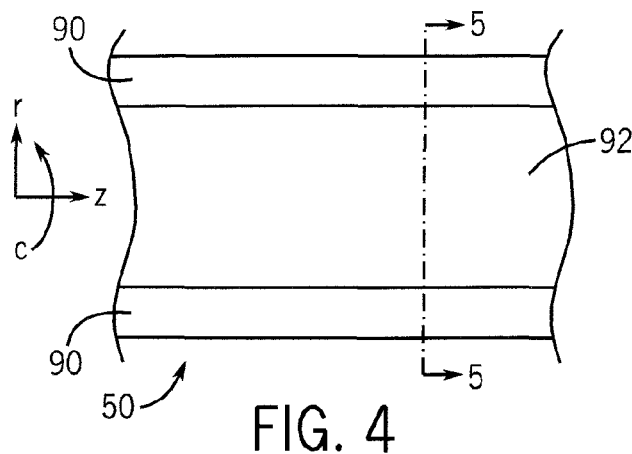
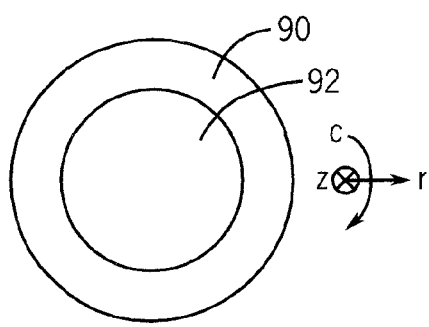
FIG. 4    FIG. 5
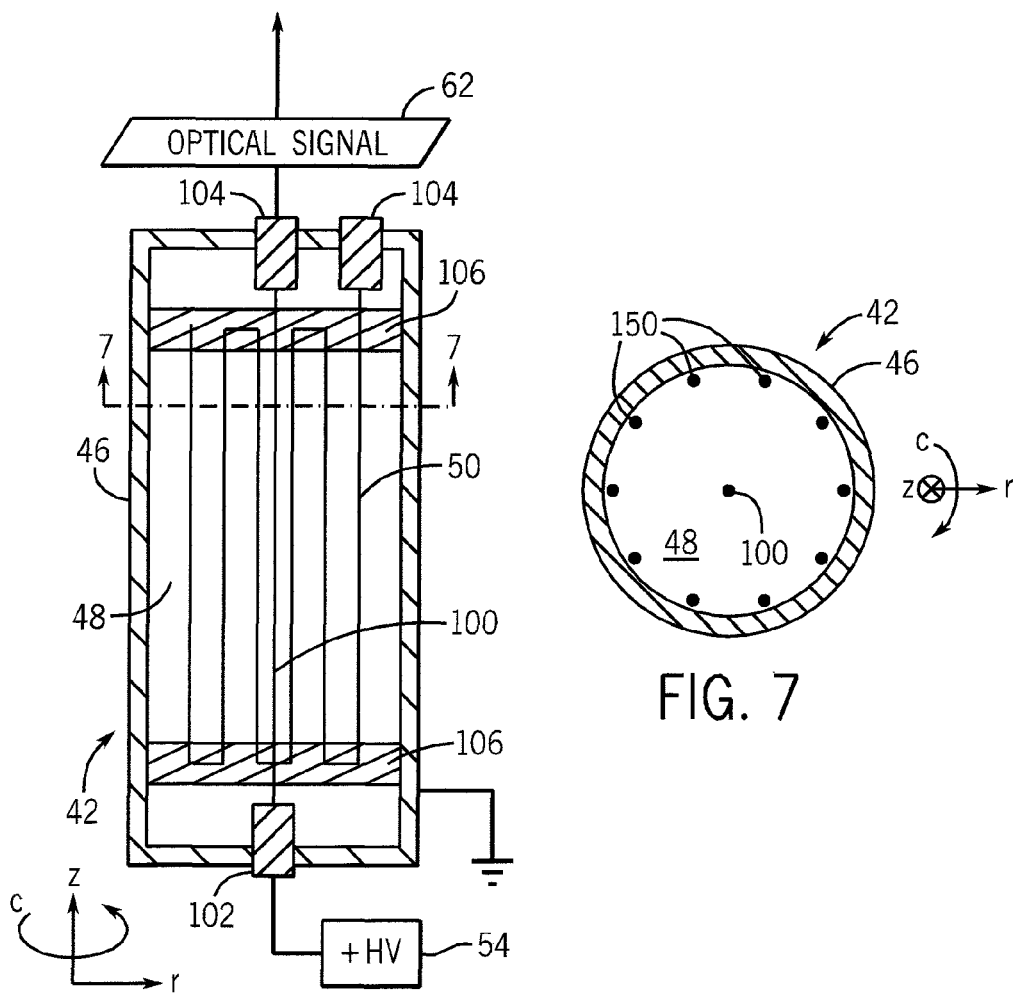
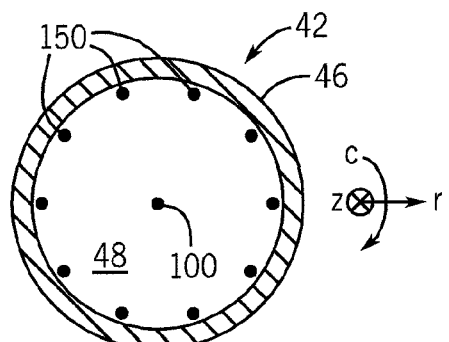
FIG. 6    FIG. 7

DOWNHOLE GAS-FILLED RADIATION DETECTOR WITH OPTICAL FIBER

BACKGROUND

This disclosure relates generally to downhole radiation detectors and, more particularly, to gas-filled tube radiation detectors that collect a light signal using an internal optical fiber.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many different downhole tools are used to determine the properties of a geological formation surrounding a well. Some of these downhole tools detect radiation from the formation—either naturally occurring or emitted from a radiation source in the downhole tool—to ascertain the properties of the formation. The radiation detectors of these tools generally take one of two forms: a scintillation detector or a gas-filled tube radiation detector.

A scintillation detector detects radiation by converting the energy of the radiation into light. Specifically, scintillating crystals in the scintillation detector may generate light when incident radiation strikes the crystals. A photomultiplier tube (PMT) may amplify the light into an electrical signal that can be interpreted by electronic components. Although scintillation detectors are effective, they may be expensive to manufacturer.

Gas-filled tube radiation detectors, also commonly referred to as Geiger-Müller tubes, may present a lower-cost option. A gas-filled tube radiation detector may detect radiation using a tube filled with an ionizing gas in an electric field. When incident radiation enters the gas-filled tube, an ionization avalanche may occur that causes electrons to rapidly move toward an anode in the gas-filled tube. These electrons produce an electrical signal on the anode that can be detected by electronics. Although gas-filled tube radiation detectors may be less costly, these detectors may also be less sensitive than scintillation detectors. Moreover, both gas-filled tube radiation detectors and scintillation detectors may use electronics located near the detectors to collect the electrical signals. Electronics that are used near the detectors may be subject to harsh downhole environmental conditions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and devices are provided relating to a gas-filled radiation detector that uses an optical fiber to detect a light signal. In one example, a radiation detector includes a housing, a fill gas within the housing, and an optical fiber within the housing. The fill gas may interact with radiation through an ionization avalanche that produces light. The optical fiber within the housing may capture the light and transmit the light out of the housing where the light may be detected.

In another example, a downhole radiation detection system that detects radiation in a borehole of a geological formation may include a gas tube radiation detector and a signal detection component. The gas tube radiation detector may generate photons when struck by incident radiation. The photons may be captured and transmitted out of the gas tube radiation detector as an optical signal by an optical fiber inside the gas tube radiation detector. The signal detection component may detect the optical signal from the optical fiber.

In another example, a drilling system includes a section of drill string with a mandrel and an annular gas tube radiation detector. The annular gas tube radiation detector may be disposed inside or outside of the mandrel and may include an optical fiber doped with a conductive material to serve as an anode. The optical fiber may also capture light produced by ionization avalanches in the gas tube radiation detector.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 4 is a cross-sectional view of an example of the optical fiber used to collect the light signal, in accordance with an embodiment;

FIG. 5 is a cross-sectional view of the optical fiber of FIG. 4 at cut lines 5-5;

FIG. 6 is a schematic diagram of a radiation detector with an axially woven optical fiber to collect a light signal, in accordance with an embodiment;

FIG. 7 is a cross-sectional view of the radiation detector of FIG. 6 at cut lines 7-7;

DETAILED DESCRIPTION

Figure 1:
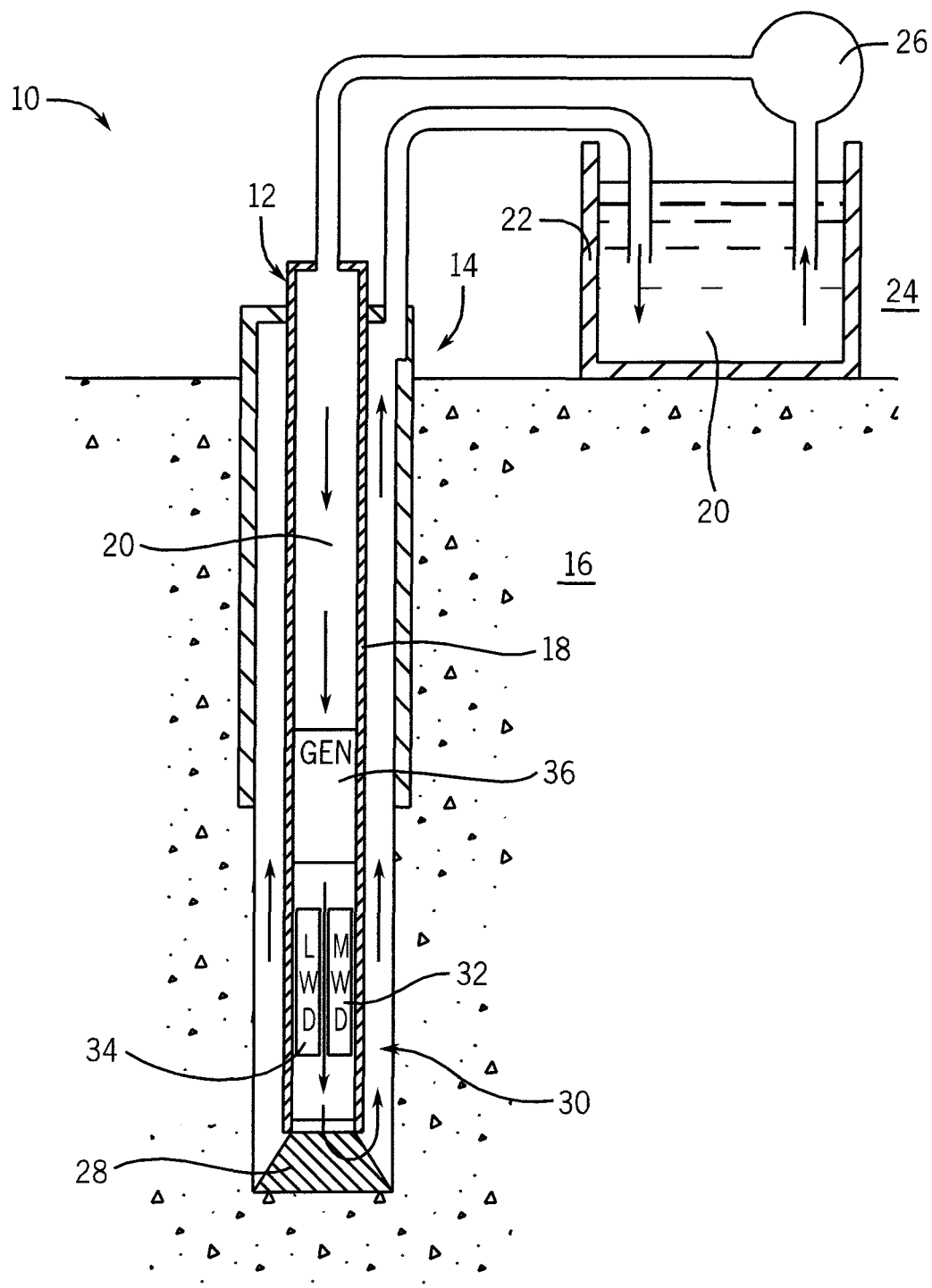
FIG. 1 is a block diagram of a drilling system with a downhole tool employing a radiation detector with an optical fiber to collect a light signal, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

This disclosure relates to a gas-filled radiation detector that can be deployed in a downhole tool. As mentioned above, a gas-filled radiation detector is filled with a gas that generates ionization avalanches when struck by incident radiation. These ionization avalanches produce not only electrons detectable as an electrical signal, but also photons. The photons from the ionization avalanches may represent light—whether in the visible spectrum or outside the visible spectrum—that may be collected by an optical fiber or a bundle of optical fibers within the gas-filled tube and output as an optical signal. The optical fiber may carry the signal to a signal detection component to convert the optical signal into an electrical and/or digital signal. The efficiency of the optical fiber may permit a vast separation, if desired, between the gas-filled tube radiation detector and the signal detection component.

The optical fiber or bundle of fibers may be doped to exhibit a variety of properties. For instance, the optical fiber or fibers may be doped with a conductive material, thereby allowing the optical fiber or fibers to replace a separate anode wire in the gas-filled tube radiation detector. Additionally or alternatively, the optical fiber or fibers may be doped with a material that permits optically simulated luminescence (OSL). The OSL-enabling material may cause the optical fiber or fibers to store light or radiation energy until light of a first wavelength pumped into the optical fiber or fibers releases the energy in the form of light of a second wavelength. Additionally or alternatively, the optical fiber or fibers may be doped with an amplifying material that may amplify the optical signal detected by the optical fiber or fibers.

The gas-filled radiation detector of this disclosure may appear in downhole tools conveyed in any suitable manner. For example, the gas-filled radiation detector may be used in downhole tools conveyed by wireline or coiled tubing. In other examples, the gas-filled radiation detector may appear in logging while drilling (LWD) or measurement while drilling (MWD) tools in a drill string used to drill a well. For instance, a drilling system 10 may convey a downhole tool that uses the gas-filled tube radiation detector, as shown in FIG. 1. The drilling system 10 of FIG. 1 includes a drill string 12 used to drill a borehole 14 into a rock formation 16. A drill collar 18 of the drill string 12 encloses the various components of the drill string 12. Drilling fluid 20 from a reservoir 22 at the surface 24 may be driven into the drill string 12 by a pump 26. The hydraulic power of the drilling fluid 20 causes a drill bit 28 to rotate, cutting into the rock formation 16. The cuttings from the rock formation 16 and the returning drilling fluid 20 exit the drill string 12 through a space 30. The drilling fluid 20 thereafter may be recycled and pumped, once again, into the drill string 12.

A variety of information relating to the rock formation 16 and/or the state of drilling of the borehole 14 may be gathered while the drill string 12 drills the borehole 14. For instance, a measurement-while-drilling (MWD) tool 32 may measure certain drilling parameters, such as the temperature, pressure, orientation of the drilling tool, and so forth. Likewise, a logging-while-drilling (LWD) tool 34 may measure the physical properties of the rock formation 16, such as density, porosity, resistivity, and so forth. These tools and others may rely on electrical power for their operation. As such, a turbine generator 36 may generate electrical power from the hydraulic power of the drilling fluid 20.

Figures 2, 3:
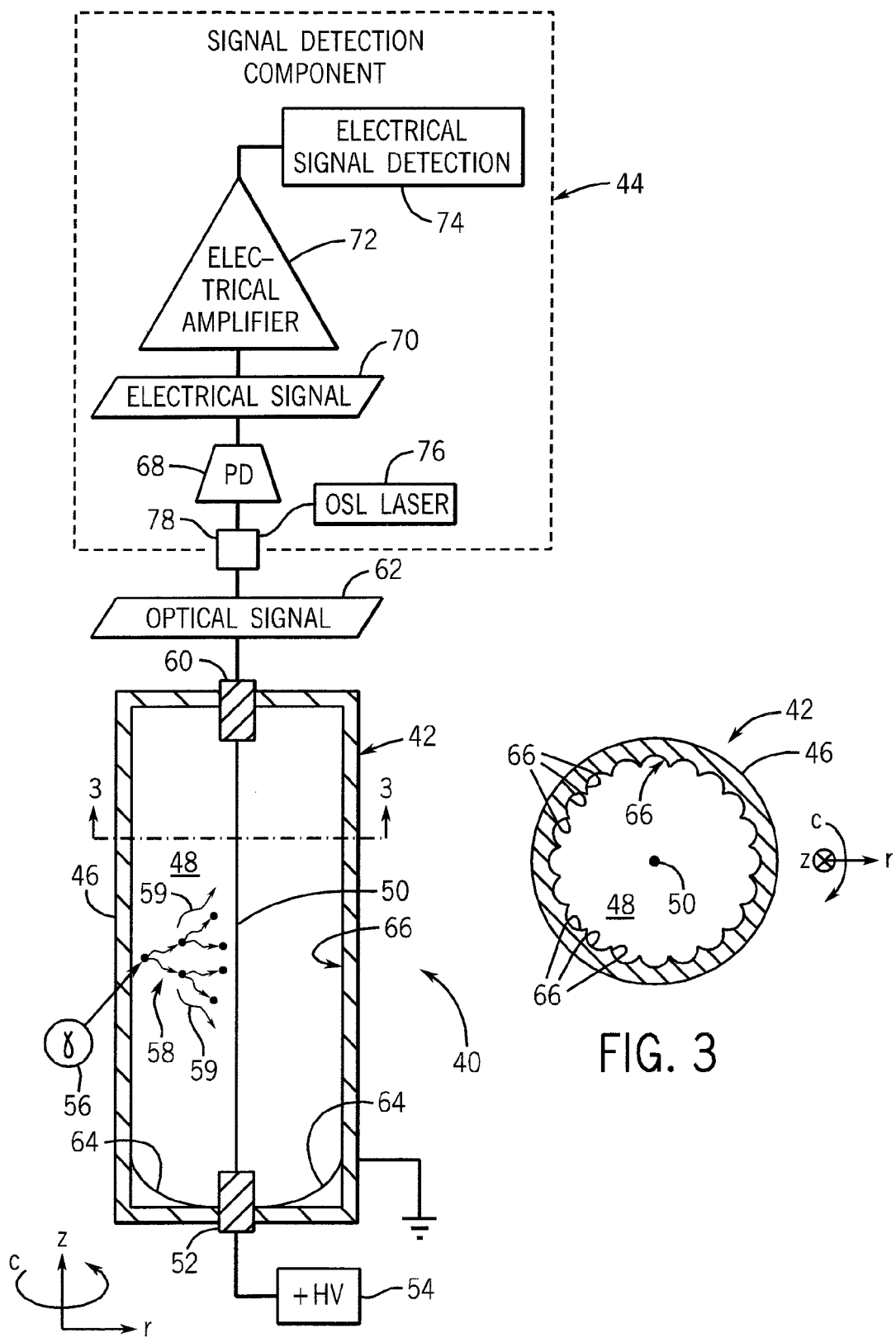
FIG. 2 is a block diagram of such a gas-filled tube radiation detector with an optical fiber to collect a light signal, in accordance with an embodiment.
FIG. 3 is a cross-sectional view of the radiation detector of FIG. 2 at cut lines 3-3.

The MWD tool 32 and/or the LWD tool 34 may employ a radiation detection system 40 as shown in FIG. 2. In other embodiments, however, the radiation detection system 40 of FIG. 2 and other drawings discussed below may be deployed in a downhole tool conveyed by wireline, coiled tubing, or any other suitable means of conveyance. The radiation detection system 40 of FIG. 2 includes a gas-filled tube radiation detector 42 and a signal detection component 44. The radiation detector 42 may be very close to the signal detection component 44 (e.g., a few centimeters) or relatively remote (e.g., a few kilometers). Indeed, in some embodiments, the signal detection component 44 may be located at the surface rather than downhole, sparing the signal detection component 44 from the harsh downhole environment. In FIG. 2 and others that follow, the radiation detector 42 may be described in relation to a longitudinal z-axis, a radial r-axis, and a circumferential c-axis. The coordinate system shown in FIG. 2 will be used throughout the various drawings discussed below to represent the spatial relationship between various system components.

A cylindrical housing 46 of the radiation detector 42 may enclose an ionizing fill gas 48. As will be discussed below, the fill gas 48 may be selected to detect ionizing radiation (e.g., gamma-rays and x-rays) or non-ionizing radiation (e.g., neutrons). The housing 46 may be formed using stainless steel. In some examples, the thickness of the housing 46 may be approximately 2 to 3 millimeters, depending on the diameter of the radiation detector 42. When the fill gas 48 is maintained at a high enough pressure to withstand the pressure of the environment, the housing 46 of the radiation detector 42 may include a beryllium window that may be permeably to low-energy gamma-rays.

An optical fiber 50 may be centered in the cylindrical radiation detector 42 and positioned generally axially along the z-axis. The optical fiber 50 may connect through an optical coupling 52 to a high voltage (HV) source 54. In the example of FIG. 2, the optical fiber 50 may be doped with a conductive material, allowing the optical fiber 50 to carry a charge. The HV source 54 may supply a voltage potential of between approximately 500V to 2000V, allowing the optical fiber 50 to serve as an anode in the radiation detector 42 when the housing 46 is grounded. This causes an electric field to form between the optical fiber 50 and the housing 46.

The resulting electric field may cause the fill gas 48 to react to incident radiation. When radiation 56 (e.g., a gamma-ray) passes through the housing 46 and into the fill gas 48, an ionization avalanche event 58 may occur. The ionization avalanche event 58 may begin when the radiation 56 strikes a molecule of the fill gas 48, causing the molecule to eject an electron and become an ion. The electron accelerates toward the positively charged optical fiber 50, while the ion approaches the grounded housing 46. When the accelerated electron strikes another molecule of the fill gas 48, another electron may be released and another ion may be generated, and this process may continue as more and more of the fill gas 48 becomes involved. The ionization avalanche event 58 may not only release electrons, however, but also may release photons 59. The photons 59 represent discrete components of light, and may be in the visible spectrum or outside the visible spectrum. Indeed, the wavelength of the photons 59 may depend on the makeup of the fill gas 48, but the photons 59 may have sufficient energy in some embodiments to cause further ionization. That is, in some cases, at least some of the photons 59 released during the ionization avalanche event 58 may also produce more ions, continuing the ionization avalanche event 58 until a substantial amount of the fill gas 48 has become ionized. After one ionization avalanche event 58 occurs, there may be a brief period of time while the ions regain electrons, becoming non-ionized, before another ionization avalanche event 58 can happen.

The photons 59 may do more than just sustain the ionization avalanche event 58. Indeed, the photons 59 may be used to detect when the ionization avalanche events 58 occur in lieu of a conventional electrical signal due to electrons on an anode. In some embodiments, the photons 59 may enter the optical fiber 50 and pass through an optical coupling 60 to output an optical signal 62. In other embodiments, the optical fiber 50 may be doped with a material that allows optically stimulated luminescence (OSL) and the energy of the photons 59 may be absorbed by the optical fiber 50 and released at a later time. It may be noted that the optical signal 62 may be obtained more quickly than an electrical signal that would be produced directly by the electrons in the ionization avalanche events 58. That is, the photons 59 from the ionization avalanche events 58 may travel much more quickly to the optical fiber 50 than the electrons and, therefore, the optical signal 62 may appear more quickly.

To ensure the photons 59 are accumulated by the optical fiber 50, the radiation detector 42 may include focal mirrors 64 to focus light reflecting off of the back of the cylindrical radiation detector 42 toward the optical fiber 50. The radiation detector 42 also may include a reflective material on the interior of the housing 46, and may be, in some examples, a series of parabolic reflectors 66. Turning briefly to FIG. 3, which represents a cross-sectional view of the radiation detector 42 along cut lines 3-3, the parabolic reflectors 66 can be more easily seen. In the example of FIG. 3, the housing 46 of the radiation detector 42 includes a corrugated surface that forms the parabolic reflectors 66. These parabolic reflectors 66 may be micro-machined or sputtered and may include any suitable reflective material, such as $Al_2O_3$. In general, the corrugated parabolic reflectors 66 may be shaped to have a parabolic focal point on the central optical fiber 50. In examples for which the optical fiber 50 or optical fibers 50 appear elsewhere in the radiation detector 42 (e.g., in the configurations of FIGS. 6-9), the corrugated parabolic reflectors 66 may be formed so as to concentrate the light on individual strokes of different optical fibers 50 or bundles of optical fibers 50 inside the radiation detector 42.

Returning to the discussion of FIG. 2, the optical signal 62 collected by the optical fiber 50 subsequently may be detected and/or interpreted by the signal detection component 44. As mentioned above, the signal detection component 44 may be located relatively close to the radiation detector 42 (e.g., a few centimeters) or may be located relatively far from the radiation detector 42 (e.g., a few kilometers). The distance between the radiation detector 42 and the signal detection component 44 may vary dramatically in different embodiments because the optical fiber 50 may very efficiently carry the optical signal 62 great distances. The optical signal 62 may be converted, for example, by an avalanche photodiode (PD) 68 into an electrical signal 70. In other examples, a photomultiplier tube (PMT) may convert the optical signal 62 into the electrical signal 70. An electrical amplifier 72 may amplify the electrical signal 70 to enable the signal to be detected by electrical signal detection circuitry 74. The electrical signal detection circuitry 74 may include any suitable circuitry, including analog-to-digital conversion (ADC) circuitry, processing circuitry, and so forth. The information from the detected electrical signal 70 may be stored and/or used to determine a property of the formation 16.

In some embodiments, the signal detection component 44 may receive the optical signal 62 as the ionization avalanche events 58 occur. Additionally or alternatively, the signal detection component 44 may receive the optical signal 62 on demand via optically stimulated luminescence (OSL) when the optical fiber 50 is doped with an OSL-enabling material. Under such conditions, the signal detection component 44 may cause the optical fiber 50 to release the optical signal 62 in the form of light of a first wavelength when an optically stimulated luminescence (OSL) laser 76 emits light of a certain second wavelength into the optical fiber 50 (e.g., through an optical coupling 78). As will be discussed below, doping the optical fiber 50 with the OSL-enabling material allows the optical fiber 50 to store energy when the optical fiber 50 is struck by photons 59 having a sufficiently high energy and/or the radiation 56.

Specifically, when the optical fiber 50 has been doped with an OSL-enabling material and is struck by the photons 59 or other radiation 56, electron-hole pairs may form. The electrons may become entrapped in trapping sites, which are imperfections of the lattice of the optical fiber 50. The electrons that have moved into these trapping sites are generally stable. When the optical fiber 50 is submitted to a stimulating wavelength by the OSL laser 76, however, the entrapped electrons free themselves, releasing optically stimulated luminescence photons of a second wavelength. This second wavelength of light may be distinguished from the first wavelength of light emitted by the OSL laser 76. As such, the signal detection component 44 may distinguish the optical signal 62 from light emitted by the OSL laser 76.

When the radiation detection system 40 uses optically stimulated luminescence (OSL), the OSL laser 76 may be operated in a continuous or pulsed mode. When operated in a continuous mode, the simulation light from the OSL laser 76 and the luminescence light emitted by the optical fiber 50 may occur substantially simultaneously. In a pulsed mode, however, the simulation light from the optical laser 76 may be emitted in pulses (e.g., having pulse widths on the order of 100 µs and in a frequency on the order of kilohertz). As a result, the luminescence light emitted by the optical fiber 50 may occur in a corresponding pulsed fashion, having pulse widths on the order of 10 or so microseconds. The simulation delay for annealing the emission of the luminescence light may be on the order of approximately 100 seconds. Thus, the pulsed mode may enable the elimination of the bias introduced by slow phosphors that may be induced in the optical fiber 50. The pulsed mode may also reduce the temperature dependence of the luminescence of the optical fiber 50. As mentioned above, some embodiments of the gas-filled tube radiation detector 42 may employ optically stimulated luminescence (OSL) while others may not. When the radiation detector 42 does not employ optically stimulated luminescence (OSL) to collect the photons 59, the optical fiber 50 may not be doped with an OSL-enabling material and the signal detection component 44 may not include the OSL laser 76 and/or the optical coupling 78.

Considering now composition of the fill gas 48, any suitable gas or mixture of gases that responds to incident radiation 56 by producing ionization avalanche events 58 and photons 59 may be used. The wavelength of the photons 59 may vary depending on the composition of the fill gas 48. In some examples, the fill gas 48 may include xenon (Xe), argon (Ar), methane ($CH_4$), carbon dioxide ($CO_2$), carbon tetrafluoride ($CF_4$), or a combination of these. For instance, the fill gas 48 may be a mixture of 90% Ar and 10% $CH_4$, a mixture of 90% Xe and 10% $CH_4$, or 95% Xe and 5% $CO_2$, to name just a few suitable gas mixtures. In some examples, the pressure of the fill gas 48 may be maintained at a pressure of between approximately 1 and 20 atm, and may be around 10 atm. It may be noted that the higher the pressure, the greater the likelihood of a higher detection rate.

Additionally or alternatively, the fill gas 48 may include gas molecules to detect non-ionizing radiation, such as neutrons, which effectively become ionizing when they interact with certain matter. Thus, the fill gas 48 may additionally include helium-3 ($^3$He) and/or boron trifluoride ($BF_3$), which may interact with neutrons to by emitting an alpha particle. The release of the alpha particle may produce an ionization avalanche event 58 within the radiation detector 42. Including gases such as these in the fill gas 48 may thereby enable a dual detection of both gamma- or X-rays and neutrons.

The optical fiber 50 may be bare—that is, not coated in an opaque sheath—to more easily capture the photons 59, as shown in FIGS. 4 and 5. In FIG. 4, the optical fiber 50 is pictured in a cross-sectional schematic manner along a z-axis through the center of the optical fiber 50. FIG. 5 illustrates a cross-sectional view of the optical fiber 50 at cut lines 5-5. The bare optical fiber 50 includes a substantially transparent cladding 90 that surrounds a substantially transparent core 92. The cladding 90 and the core 92 may be any suitable materials of different refractive indices to cause light propagating through the optical fiber 50 to be transmitted along the optical fiber 50 through total internal reflection. To collect the light generated by the ionization avalanche events 58, the optical fiber 50 does not include a sheathing material that would insulate the optical fiber 50, but would also prevent light from entering the optical fiber 50 from within the radiation detector 42.

The cladding 90 or the core 92 also may be seeded and/or doped with impurities to impart specific properties to the optical fiber 50 to enhance its operation as a light collector and/or radiation detector within the radiation detector 42. Indeed, in some examples, the cladding 90 or the core 92 may be doped with a material to enable optically stimulated luminescence (OSL), a light-amplifying material, and/or an electrically conductive material. The various impurities doped into the optical fiber 50 may be seeded into the cladding 90 or formed in the core 92. In some examples, these impurities may represent finely ground powder (e.g., on the order of a few nanometers to a few microns). The finely ground powder may be seeded onto the cladding 90 of the optical fiber 50 through electrostatic sputtering, phase vapor deposition (PVD), or thermally sprayed onto the outer surface of the cladding 90 of the optical fiber 50, to name a few examples. Additionally or alternatively, such impurities may be embedded in the core 92 of the optical fiber 50. During the manufacturing process, the core 90 of the optical fiber 50 may be filled in with the finely ground powder, and extruded and drawn to a suitable dimension.

Optically Stimulated Luminescence (OSL) Dopants

As mentioned above, in some embodiments of the radiation detector 42, the optical fiber 50 or bundles of optical fibers 50 may not only collect the photons 59 but also to store the energy of the photons 59 until released by the OSL laser 76. In addition, in some embodiments, the optical fiber 50 or bundles of optical fibers 50 may also detect incident ionizing or non-ionizing radiation through optically simulated luminescence (OSL). Many varieties of OSL-enabling materials may be seeded or formed into the cladding 90 and/or the core 92 of the optical fiber 50 or bundles of optical fibers 50 to enable this functionality.

To detect ionizing radiation (e.g., the photons 59 when the photons 59 have a sufficiently high energy, gamma-rays, or x-rays), any suitable material that retains optical luminescence in harsh environments that commonly occur downhole may be used (e.g., temperatures higher than 100° C.). Such OSL-enabling materials may include MgS doped with a rare earth, BaS doped with a rare earth, SrS doped with a rare earth, SrSe doped with a rare earth, $\alpha Al_2O_3$, $Al_2O_3$:C and quartz. The rare earth doping impurities may be, for example, Sm, Eu, or Ce. OSL-enabling materials sensitive to non-ionizing radiation such as neutrons that may be seeded or formed in the optical fiber 50 may be phosphors, BeO, $CaF_2$:Mn, and $CaSO_4$, and may, in some embodiments, include a converting layer of fluoride oxide ($V_2O_3$) or lithium drifted glass.

Optically Amplifying Dopants

Even without the use of optically stimulated luminescence (OSL), the optical fiber 50 or bundles of optical fibers 50 may enhance the optical signal 62 by amplifying the light of the photons 59. Doing so may enhance the resolution of the radiation detector 42. As such, the optical fiber 50 may be doped with laser-active rare earth ions that apply a gain to the optical signal 62 in the optical fiber 50. The laser-active rare earth ions absorb pump light from a pump laser, which may be used in addition to or as an alternative to the OSL laser 76. By absorbing the pump light, the laser-active rare earth ions become excited into metastable levels, allowing light amplification via simulated emission. Doping the optical fiber 50 with these materials may provide a high gain efficiency of the photons 59 traveling through the optical fiber 50 from the ionization avalanche events 58.

In Table 1 below, various laser-active ions that may be doped into the optical fiber 50, as well as associated host materials from which the optical fiber 50 may be based, are shown in table format:

TABLE 1

| Optically amplifying dopant | Host glasses | Emission wavelengths |
| --- | --- | --- |
| neodymium ($Nd^{3+}$) | silicate and phosphate glasses | 1.03-1.1 µm, 0.9-0.95 µm, 1.32-1.35 µm |
| ytterbium ($Yb^{3+}$) | silicate glass | 1.0-1.1 µm |
| erbium ($Er^{3+}$) | silicate and phosphate glasses, fluoride glasses | 1.5-1.6 µm, 2.7 µm, 0.55 µm |
| thulium ($Tm^{3+}$) | silicate and germanate glasses, fluoride glasses | 1.7-2.1 µm, 1.45-1.53 µm, 0.48 µm, 0.8 µm |
| praseodymium ($Pr^{3+}$) | silicate and fluoride glasses | 1.3 µm, 0.635 µm, 0.6 µm, 0.52 µm, 0.49 µm |
| holmium ($Ho^{3+}$) | silicate glasses, fluorozirconate glasses | 2.1 µm, 2.9 µm |

Thus, in one example, the optical fiber 50 may be doped with erbium to amplify the optical signal 62 if desired. In other examples, the optical fiber 50 may be doped with any other suitable materials to amplify the optical signal 62, including those listed above, either alone or in various combinations with one another.

Electrically Conductive Dopants

Other materials that may be used in the cladding 90 or the core 92 of the optical fiber 50 may include electrically conductive materials. When the optical fiber 50 has been doped with electrically conductive materials, the optical fiber 50 may operate as the anode of the radiation detector 42, as generally discussed above with reference to FIGS. 2 and 3. Conductive dopants such as arsenic or gallium may provide conductivity to enable the optical fiber 50 to serve as the anode of the radiation detector 42.

The various dopant materials discussed above may be used in suitable combination in the optical fiber 50 to impart the respective properties allowed by each. Still, it should be understood that the optical fiber 50 may not necessarily be doped with any of the above materials in some embodiments. For instance, the radiation detector 42 may employ a separate anode wire and the optical fiber 50 instead may represent a bundle of optical fibers 50 around the separate anode wire.

In fact, many different configurations of the radiation detector 42 are possible. For example, as shown in FIG. 6, the radiation detector 42 may include a wound optical fiber 50 or bundles of optical fibers 50 wrapped within the housing 46 of the radiation detector 42. As illustrated in FIG. 7, which provides a cross-sectional view of the radiation detector 42 at cut lines 7-7, the optical fiber 50 or bundles of optical fibers 50 appear outside of the central area of the radiation detector 42 where the fill gas 48 is located. The optical fiber 50 or bundles of optical fibers 50 may not be charged. Instead, a metallic anode 100 may be centered in the radiation detector 42. By way of example, the metallic anode 100 may be tungsten or gold in some embodiments. In one example, the optical fiber 50 or bundles of optical fibers 50 may be doped with an optically amplifying material to enhance the optical signal 62. In other examples, the optical fiber 50 or bundles of optical fibers 50 may be doped with a material that enables optically stimulated luminescence (OSL). In still other examples, the optical fiber 50 or bundles of optical fibers 50 may not be doped with either of these materials.

Before continuing, it should be appreciated that the cross-sectional view of FIG. 7 illustrates the optical fiber 50 or bundles of optical fibers 50 as appearing in a few discrete locations longitudinally at certain radial distances along the radial axis r of the radiation detector 42. It should be appreciated, however, that in an actual implementation, the optical fiber 50 or bundles of optical fibers 50 may be disposed much more closely to one another and/or may wrap many more times axially through the inner circumference of the radiation detector 42. Indeed, an actual implementation may employ many more turns to increase the amount photons 59 that can be captured by the optical fiber 50 or bundles of optical fibers 50.

Since the optical fiber 50 or bundles of optical fibers 50 may not serve as the anode to the radiation detector 42, the high voltage power source 54 may supply a high voltage potential to the anode wire 100 through a pressure coupling 102. The pressure coupling 102 and a corresponding pressure coupling 104 may insulate the anode wire 100 from the housing 46 of the radiation detector 42. As in the configuration of FIGS. 2 and 3, above, the housing 46 is grounded, thereby creating an electric field between the anode wire 100 and the housing 46 that enables the fill gas 48 to detect radiation.

A support structure 106 may allow the optical fiber 50 or bundles of optical fibers 50 wind around the outer circumference of the inner chamber of the radiation detector 42 where the fill gas 48 is located. The support structure 106 may be any suitable non-conductive material, including plastic or comparable materials. Winding the optical fiber 50 or bundles of optical fibers 50 through the radiation detector 42 in this manner may increase the likelihood that the photons 59 will be detected and emitted as the optical signal 62. The optical signal 62 may exit the radiation detector 42 through an optical coupling 108 disposed in a radially central location or, as shown in FIG. 6, through a radially non-central location in the radiation detector 42.

Figures 8, 9:
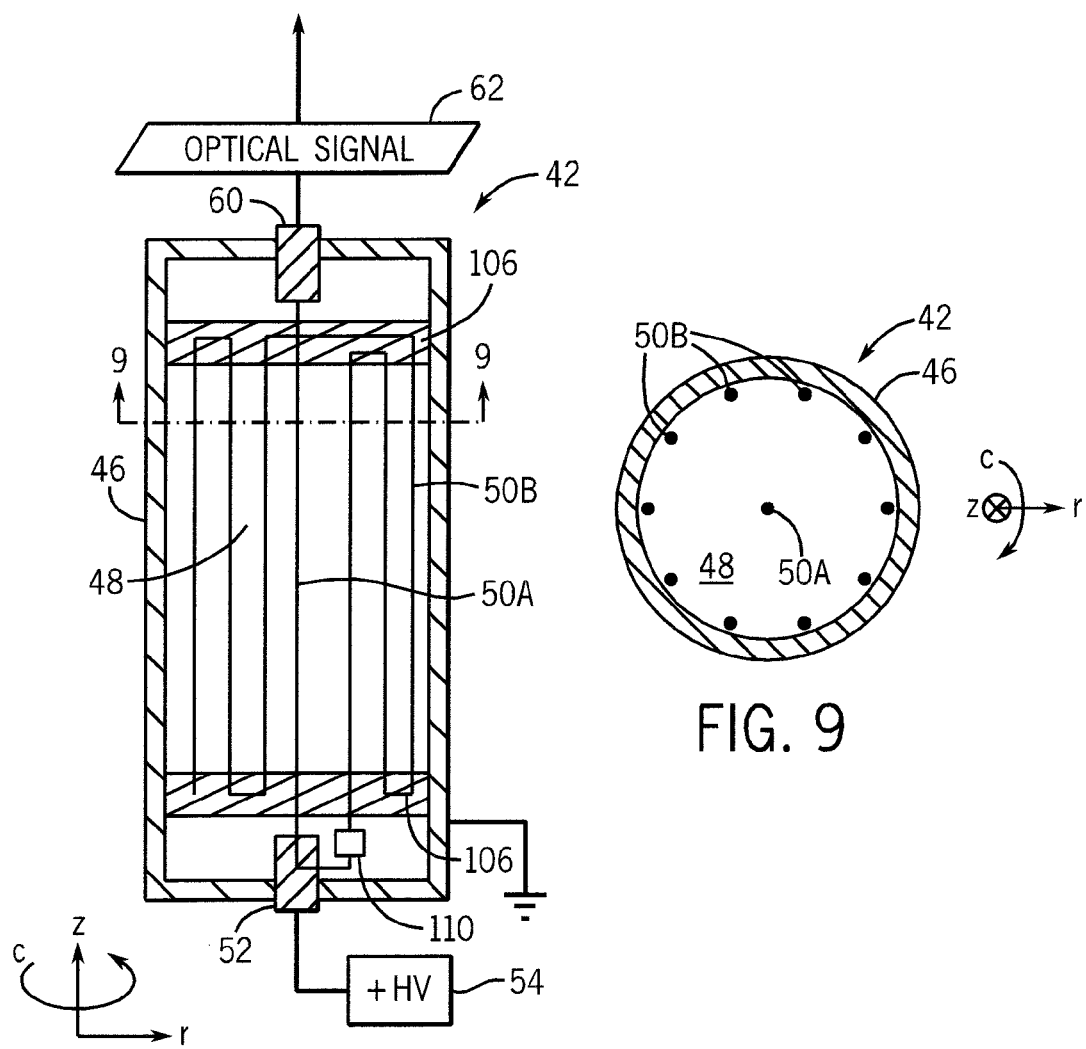
FIG. 8 is a schematic diagram of a gas-filled tube radiation detector using a first segment of an optical fiber that is axially woven to collect light and a second segment of the optical fiber to serve as an anode, in accordance with an embodiment.
FIG. 9 is a cross-sectional view of the radiation detector of FIG. 8 at cut lines 9-9.

Other configurations of the radiation detector 42 also may wind the optical fiber 50 or bundles of optical fibers 50 in a manner similar to that shown in FIGS. 6 and 7. FIGS. 8 and 9, for example, illustrate a configuration in which a conductively doped optical fiber 50A or bundle of optical fibers 50A are optically joined to a non-conductive optical fiber 50 or bundles of optical fibers 50B thorough optical couplings 110 and 52. With this configuration, the central conductive optical fiber 50A or bundles of optical fibers 50A may be doped with an electrically conductive material and may serve as the anode in the radiation detector 42. By serving as the anode, an electrical field may form between the housing 46, which is grounded, and the conductive optical fiber 50A, which is supplied by a high voltage (HV) power source 54. The electric field between the conductive optical fiber 50A and the housing 46 allows the fill gas 48 to produce ionization avalanche events 58 (e.g., in the manner of FIG. 2) when radiation enters the radiation detector 42. The optical coupling 110 may join the non-conductive optical fiber 50B or bundles of fibers 50B to the conductive optical fiber 50A, through which the optical signal 62 is transmitted out of the radiation detector 42. In some embodiments, optical fiber 50B or bundles of fiber 50B may be doped with an optically amplifying material, such as erbium, to amplify the light captured by the optical fiber 50B or bundles of optical fibers 50B when supplied with pump light. As in the configuration of FIGS. 6 and 7, the non-conductive optical fiber 50B or bundles of optical fibers 50B are woven back and forth across the radiation detector 42 through a support structure 106 of any suitable material.

A cross-sectional view of the configuration of FIG. 8 along cut lines 9-9 appears in FIG. 9. As illustrated in FIG. 9, the conductively doped optical fiber 50A or bundles of optical fibers 50A may be central to the cylindrical radiation detector 42. At a radial distance from the center, the non-conductive optical fibers 50B or bundles of optical fibers 50B wind back and forth along the axial or longitudinal (z-axis) direction. Although FIG. 9 illustrates that the non-conductive optical fiber 50B or bundles of optical fibers 50B wind back and forth only a relatively limited number of times, an actual implementation may employ many more turns. This may allow the non-conductive optical fiber 50B and/or bundles of optical fibers 50B to capture a greater number of the photons 59. In some examples, the housing 46 of the radiation detector 42 may include the parabolic reflectors 66 shown in FIG. 3. The parabolic reflectors 66 may be angled to direct light toward the non-conductive optical fiber 50B or bundles of optical fibers 50B and/or toward the optical fiber 50A or bundles of optical fibers 50A.

Some configurations of the radiation detector 42 may be used in a drill string (e.g., the drill string 12 of FIG. 1). In one example, shown in FIGS. 10 and 11, a section of drill string 120 includes a mandrel 122 around which the radiation detector 42 is disposed. The interior of the mandrel 122 may include a housing 124, an inner support material 126, and a fluid channel 128. The housing 124 may include any suitable material, such as stainless steel. The fluid channel 128 may allow the drilling fluid 20 to pass through the mandrel 122. Support electronics 130 may be disposed within the inner mandrel 122 and may receive the optical signal 62 via an optical coupling 132 also may supply a high voltage signal to the optical fiber 50 or bundles of optical fibers 50, which may be doped with conductive materials. A support structure 106 may wind the optical fiber 50 or bundles of optical fibers 50 back and forth around the annular shape of the radiation detector 42. The outer housing 46 of the radiation detector 42 of FIG. 10 may be grounded, thereby generating an electric field between the housing 46 and the conductively doped optical fiber 50 or bundles of optical fibers 50.

Figures 10, 11:
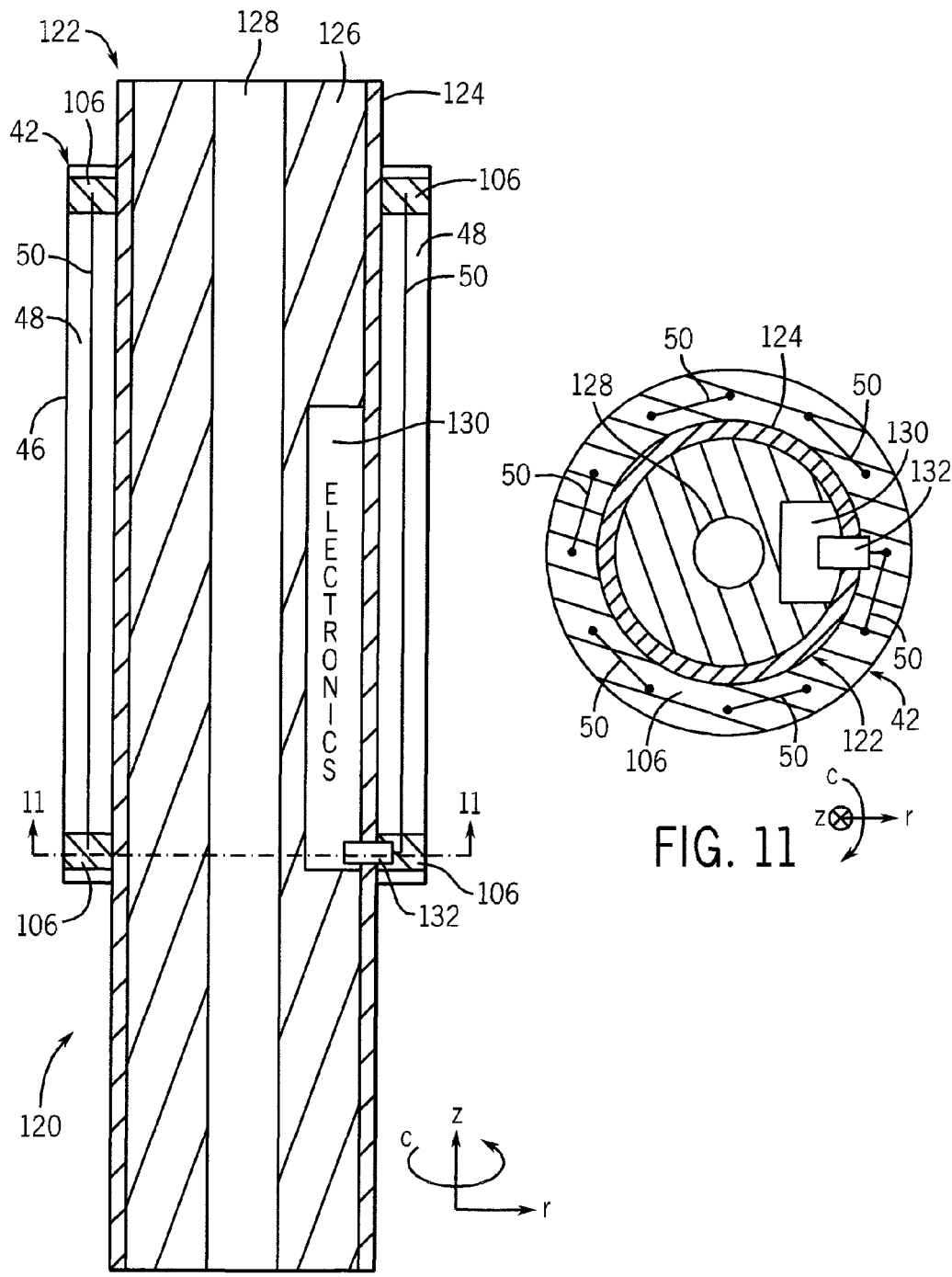
FIG. 10 is a schematic diagram of a section of drill string with an annular gas-filled radiation detector disposed outside of a mandrel of the drill string, in accordance with an embodiment.
FIG. 11 is a cross-sectional view of the section of drill string of FIG. 10 at cut lines 11-11.

FIG. 11 provides a cross-sectional view of the configuration of FIG. 10 at cut lines 11-11. As seen in FIG. 11, the optical fiber 50 or bundles of optical fibers 50 may be wound around through the support structure 106 of the radiation detector 42. As can also be seen in FIG. 11, the radiation detector 42 has an annular form that surrounds the cylindrical shape of the mandrel 122. Although FIG. 11 schematically illustrates the optical fiber 50 or bundles of optical fibers 50 as having a relatively limited number of windings, an actual implementation may include many more. The relatively close spacing of the optical fiber 50 or bundles of optical fibers 50 may allow the electrical field formed between the housing and the optical fiber 50 or bundles of optical fibers 50 to remain relatively uniform throughout the annular radiation detector 42 of FIGS. 10 and 11.

Figure 12:
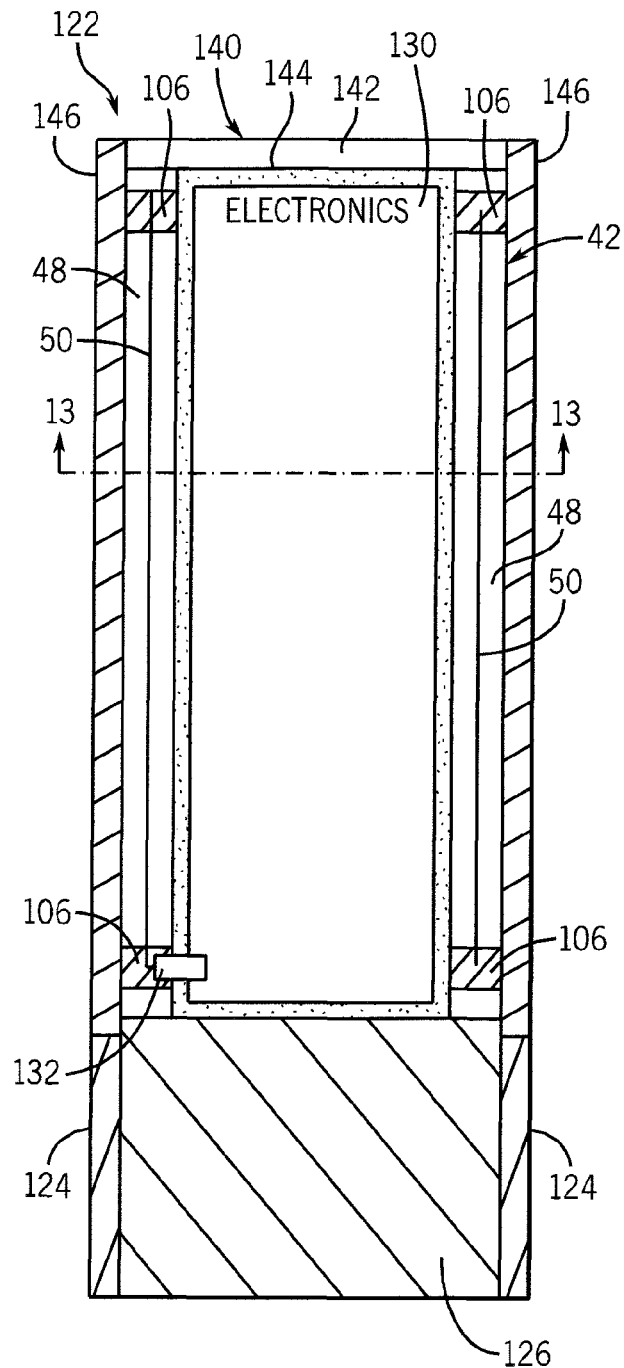
FIG. 12 is a schematic diagram of a section of drill string with an annular gas-filled radiation detector disposed within an inner mandrel of the drill string, in accordance with an embodiment.
Figure 13:
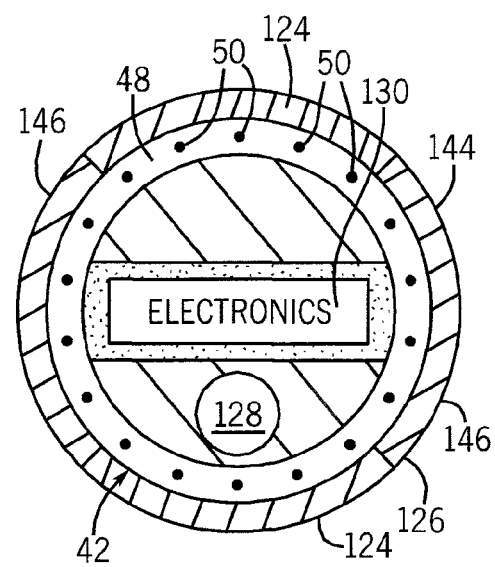
FIG. 13 is a cross-sectional view of the section of the drill string shown in FIG. 12 at cut lines 13-13.

In another configuration, shown in FIGS. 12 and 13, the radiation detector 42 may be disposed within the mandrel 122 in an inner mandrel 140. As in the configuration of the radiation detector 42 shown in FIGS. 10 and 11, the radiation detector 42 of FIGS. 12 and 13 may include support electronics 130. The support electronics 130 may receive the optical signal 62 from the optical fiber 50 or bundles of optical fibers 50 via an optical coupling 132. In addition, the support electronics 130 may supply a high voltage signal to the optical fiber 50 or bundles of optical fibers 50, which may serve as the anode of the radiation detector 42. The housing 46 of the radiation detector 42 may be grounded, thereby creating an electric field between the optical fiber 50 or bundles of optical fibers 50. A sealing wall 142 may seal the radiation detector 42 and the electronics 130 within the inner mandrel 140. In some examples, the supporting electronics 130 may be hermetically sealed within a sealing structure 144.

Because the radiation detector 42 is disposed in the inner mandrel 140 of the mandrel 122, the material used in the housing 124 (e.g., stainless steel) may prevent some radiation from entering the radiation detector 42. As such, the housing of the mandrel 122 near the radiation detector 42 may include beryllium windows 146. A cross-sectional view of the configuration of FIG. 12 at cut lines 13-13 appears in FIG. 13. As seen in FIG. 13, the radiation detector 42 forms an annular shape within the inner mandrel 140 of the mandrel 122. The optical fiber 50 or bundles of optical fibers 50 may be woven axially (e.g., along the z-axis) through the radiation detector 42 as shown. In an actual implementation, the optical fiber 50 or bundles of optical fibers 50 may be located more closely to one another and wrapped with tighter turns through the support structure 106. The beryllium windows 146 may not fully surround the radiation detector 42, but rather may form windows within the housing 124 of the mandrel 122. In other embodiments, the beryllium windows 146 may be smaller or larger in relation to the radiation detector 42.

Figure 14:
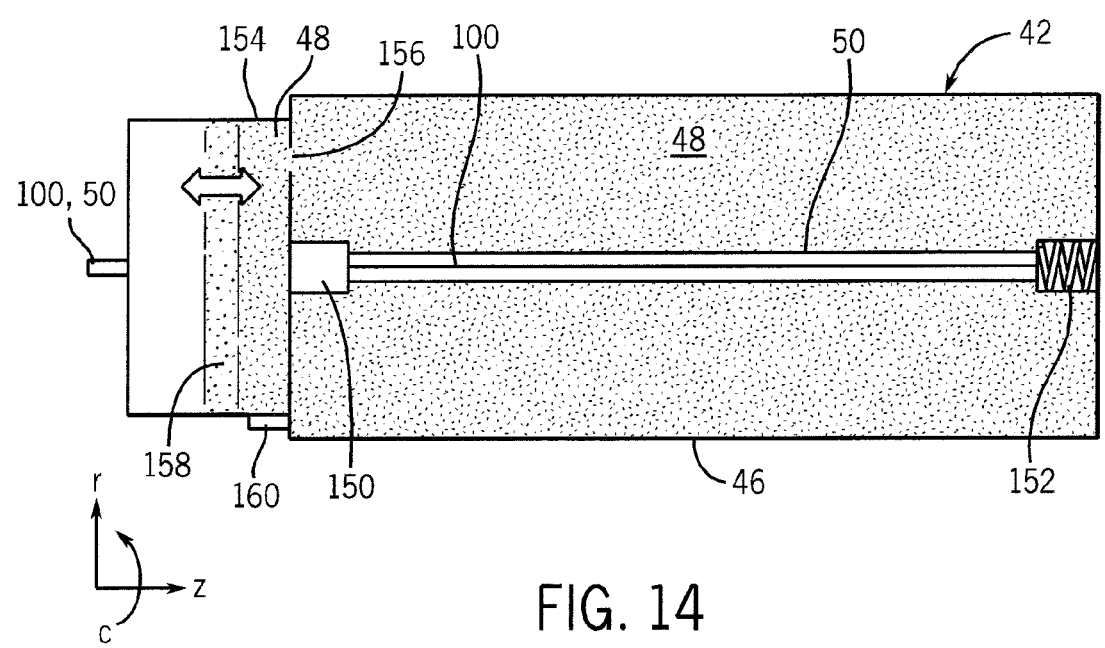
FIG. 14 is a schematic diagram of a gas-filled radiation detector with pressure compensation, in accordance with an embodiment.

Finally, it may be appreciated that any of the configurations of the radiation detector 42 discussed above may benefit from maintaining the fill gas 48 at a constant pressure even as the radiation detector 42 is lowered into a borehole 14. In an example shown in FIG. 14, an optical fiber 50 or bundles of optical fibers 50 may appear along an anode wire 100 of tungsten or gold. A ceramic electrical insulator 150 may electrically insulate the anode wire 100. In some embodiments, the ceramic electrical insulator may also serve as an optical coupling to enable the optical fiber 50 or bundles of optical fibers 50 to output a signal from within the radiation detector 42, or separate optical couplings may do so. A torsion spring 152 may account for movement by the radiation detector 42 under the harsh conditions that may occur when conveyed into the borehole 14, preventing the optical fiber(s) 50 and the anode wire 100 from breaking from excessive tension.

A pressure compensation chamber 154 may allow the fill gas 48 to pass through an aperture 156 into the radiation detector 42. The fill gas 48 may be forced through the aperture 156 by a moving piston 158 supplied with energy by a spring or an actuator. In some embodiments, the moving piston 158 may be controlled based on the temperature of the environment into which the radiation detector 42 has been deployed. Thus, a temperature sensor 160 may detect the temperature near the radiation detector 42, and the moving piston 158 may increase or decrease the amount of force being applied to the fill gas 48 in the pressure compensation chamber 154 based on this temperature measurement. Although the pressure compensation chamber 154 is shown to be adjacent to the radiation detector 42, the pressure compensation chamber 154 may be quite remote. For example, in some embodiments, the pressure compensation chamber 154 may be located in a high-pressure vessel farther away.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A radiation detector comprising:
a housing configured to serve as a cathode in an ionization avalanche;
a fill gas disposed within the housing, wherein the fill gas is configured to interact with radiation through the ionization avalanche that produces light; and
an optical fiber within the housing configured to capture the light and transmit the light out of the housing, wherein the optical fiber is doped with a conductive material and is configured to serve as an anode in the ionization avalanche.

2. The radiation detector of claim 1, wherein the housing comprises a reflective inner surface configured to reflect the light from the ionization avalanche toward the optical fiber.

3. The radiation detector of claim 1, wherein the conductive material comprises arsenic or gallium, or a combination thereof.

4. The radiation detector of claim 1, wherein the optical fiber is doped with an impurity configured to enable optically stimulating luminescence when the optical fiber is struck by the light, by radiation that does not otherwise interact with the fill gas, or by both.

5. The radiation detector of claim 4, wherein the impurity is configured to enable optically stimulating luminescence when the optical fiber is struck by ionizing radiation, wherein the ionizing radiation comprises:
the light; or
the radiation that does not otherwise interact with the fill gas; or
both.

6. The radiation detector of claim 4, wherein the impurity is configured to enable optically stimulating luminescence when the optical fiber is struck by non-ionizing radiation.

7. The radiation detector of claim 4, wherein the impurity comprises MgS doped with a rare earth, BaS doped with a rare earth, SrS doped with a rare earth, SrSe doped with a rare earth, $\alpha Al_2O_3$, $Al_2O_3$:C, a quartz, a phosphor, BeO, $CaF_2$:Mn, or $CaSO_4$, or any combination thereof.

8. The radiation detector of claim 1, wherein the optical fiber is doped with an optically amplifying material configured to amplify the light that is captured by the optical fiber from the ionization avalanche.

9. The radiation detector of claim 8, wherein the optically amplifying material comprises neodymium ($Nd^{3+}$), ytterbium ($Yb^{3+}$), erbium ($Er^{3+}$), Thulium ($Tm^{3+}$), praseodymium ($Pr^{3+}$), or holmium ($Ho^{3+}$), or any combination thereof.

10. The radiation detector of claim 1, wherein the optical fiber comprises one of a plurality of optical fibers in a bundle of optical fibers disposed within the housing, the optical bundle of optical fibers being configured to capture the light from the ionization avalanche event.

11. The radiation detector of claim 1, wherein the optical fiber is wrapped back and forth along at least one dimension of the radiation detector to enlarge a surface area of the optical fiber within the radiation detector and capture more of the light from the ionization avalanche than otherwise.

12. The radiation detector of claim 1, wherein the housing is generally cylindrical and the optical fiber comprises a central segment and a radial segment, the central segment being disposed centrally and axially within the cylindrical housing and being doped with a conductive material to enable the central segment to serve as an anode while also capturing some of the light from the ionization avalanche, and the radial segment being disposed generally axially within the cylindrical housing a radial distance from the central segment and wrapping back and forth axially within the cylindrical housing to enlarge a surface area of the optical fiber within the radiation detector and capture more of the light from the ionization avalanche than otherwise.

13. The radiation detector of claim 1, wherein the optical fiber is connected to an electrical power source.

14. A downhole radiation detection system configured to detect radiation in a borehole of a geological formation, the system comprising:
a gas tube radiation detector configured to generate photons when struck by incident radiation, the photons being captured and transmitted out of the gas tube radiation detector as an optical signal by an optical fiber inside the gas tube radiation detector; and
a signal detection component configured to detect the optical signal from the optical fiber,
wherein the gas tube radiation detector includes:
a housing configured to serve as a cathode in an ionization avalanche;
a fill gas disposed within the housing, wherein the fill gas is configured to interact with radiation through the ionization avalanche that produces light; and
the optical fiber disposed within the housing configured to capture the light and transmit the light out of the housing, wherein the optical fiber is doped with a conductive material and is configured to serve as an anode in the ionization avalanche.

15. The system of claim 14, wherein the gas tube radiation detector is disposed within a downhole tool and the signal detection component is remote from the downhole tool.

* * * * *